United States Patent
Nicholas

(10) Patent No.: US 8,852,332 B2
(45) Date of Patent: Oct. 7, 2014

(54) SYNTHETIC MODIFIER FOR HOT ASPHALTIC MIXES FOR ROAD PAVING AND METHOD OF MAKING SAME

(75) Inventor: Dolly Nicholas, Marabella (TT)

(73) Assignee: JS3D Technology Company Limited, Gros Islet (LC)

(*) Notice: Subject to any disclaimer, the term of this patent is extended or adjusted under 35 U.S.C. 154(b) by 197 days.

(21) Appl. No.: 13/558,558

(22) Filed: Jul. 26, 2012

(65) Prior Publication Data

US 2014/0026785 A1  Jan. 30, 2014

(51) Int. Cl.
C08L 95/00 (2006.01)
C04B 14/06 (2006.01)
C04B 14/10 (2006.01)

(52) U.S. Cl.
USPC .......... 106/284.03; 106/284.02; 106/482; 106/483; 106/484; 106/486; 106/811; 106/812

(58) Field of Classification Search
USPC .......... 106/284.03, 482, 483, 484, 486, 812, 106/817, 287.17, 287.34, 287.1, 284.02, 106/811
See application file for complete search history.

(56) References Cited

U.S. PATENT DOCUMENTS

| | | | | |
|---|---|---|---|---|
| 2,730,454 A * | 1/1956 | Sommer et al. | ............ | 106/284.4 |
| 5,183,710 A * | 2/1993 | Gerbino | .................. | 106/287.16 |
| 5,292,908 A * | 3/1994 | Onikata et al. | ............. | 556/173 |
| 5,443,633 A * | 8/1995 | Hirsbrunner et al. | .... | 106/287.13 |
| 5,491,248 A * | 2/1996 | Kondo et al. | ................. | 556/173 |
| 5,539,029 A | 7/1996 | Burris | | |
| 5,782,961 A * | 7/1998 | Karlsson | .................. | 106/287.14 |
| 5,824,226 A * | 10/1998 | Boyd et al. | .................... | 210/679 |
| 6,558,462 B1 * | 5/2003 | Nicholas | .................. | 106/281.1 |
| 6,706,787 B1 | 3/2004 | Burris et al. | | |
| 7,025,822 B2 | 4/2006 | Partanen et al. | | |
| 7,582,155 B2 * | 9/2009 | Mehta et al. | ............ | 106/284.01 |
| 7,981,517 B2 | 7/2011 | Walthe et al. | | |
| 8,137,451 B2 * | 3/2012 | Aerts et al. | ................ | 106/281.1 |
| 2001/0002229 A1 | 5/2001 | Schaeffer et al. | | |
| 2005/0027046 A1 | 2/2005 | Partanen | | |
| 2006/0074152 A1 | 4/2006 | Graves et al. | | |
| 2008/0190319 A1 | 8/2008 | Reisacher et al. | | |
| 2009/0039318 A1 * | 2/2009 | Hayner et al. | ............... | 252/478 |
| 2009/0275679 A1 * | 11/2009 | Flanigan | .......................... | 524/2 |
| 2011/0048569 A1 * | 3/2011 | Stuart et al. | .................. | 138/145 |
| 2011/0233105 A1 | 9/2011 | Bailey | | |
| 2014/0000152 A1 * | 1/2014 | Torncrona et al. | ............ | 106/277 |

FOREIGN PATENT DOCUMENTS

| | | |
|---|---|---|
| CN | 101092518 | 12/2007 |
| JP | 2007-302710 | 11/2007 |
| WO | WO 2012/123386 A1 * | 9/2012 |

OTHER PUBLICATIONS

English translation of JP 2007/302710; Nov. 2007.*
Claytone 40-Rheological Additive; BUNTECH Technologia em Insumos LTDA; 1 page; no date available.*
Claytone 40-Southern Clay Products, Inc.; 2 pages; no date available.*

(Continued)

Primary Examiner — Helene Klemanski
(74) Attorney, Agent, or Firm — Nixon & Vanderhye, PC

(57) ABSTRACT

A synthetic modifier known as JSSM for hot asphaltic paving mixes is formed of refinery bitumen, of which one example is 60/70 penetration grade, and clay and/or sand that is siloxane bonded. Another component may be a UV absorber. The synthetic modifier is added to refinery bitumen to produce a paving asphalt cement.

18 Claims, 1 Drawing Sheet

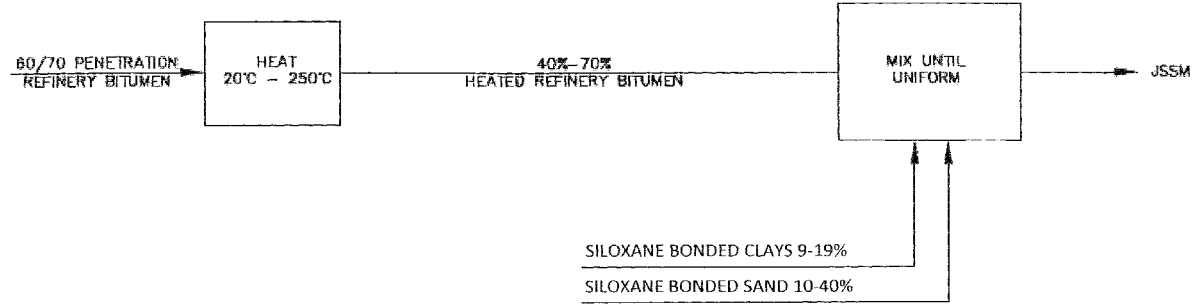

(56) References Cited

OTHER PUBLICATIONS

"Intercalation of Silica in Smectite"; Endo et al.; Clays and Clay Minerals, vol. 28, No. 2, pp. 105-110; 1980, no month available.*

"Surface geochemistry of the clay minerals"; Sposito et al., Proc. Natl. Acad. Sci. USA; vol. 96; pp. 3358-3364; Mar. 1999.*

* cited by examiner

```
                          JSSM
                           ↑
                    ┌─────────────┐
                    │  MIX UNTIL  │ ← SILOXANE BONDED CLAYS 9-19%
                    │   UNIFORM   │ ← SILOXANE BONDED SAND 10-40%
                    └─────────────┘
                           ↑
                  40%-70% HEATED REFINERY BITUMEN
                           │
                    ┌─────────────┐
                    │    HEAT     │
                    │ 20°C – 250°C│
                    └─────────────┘
                           ↑
                60/70 PENETRATION REFINERY BITUMEN
```

SYNTHETIC MODIFIER FOR HOT ASPHALTIC MIXES FOR ROAD PAVING AND METHOD OF MAKING SAME

BACKGROUND OF THE INVENTION

1. Field of the Invention

The present invention relates to a synthetic modifier for hot asphaltic mixes for road paving and other applications, and to a method of making the synthetic modifier known as JSSM.

2. Description of the Background Art

At the present time, other than the present synthetic modifier, Trinidad Lake Asphalt (TLA) is the only other solid bituminous modifier with inherent mineral matter which is classified as Superpave Grade. Problems associated with TLA are documented in U.S. Pat. No. 6,558,462. Some of these problems are as follows:

1. Sedimentation;
2. Single source supply;
3. Costly process, requiring specialized equipment;
4. Expensive packaging material, which must be disposed of, thereby presenting potential environmental issues;
5. Topping up of the drums or double handling.

The synthetic modifier of the present invention is not subject to any of the above-identified problems and possesses many advantages over TLA in performance, method of manufacture, handling transportation and cost of production.

BRIEF SUMMARY OF THE INVENTION

The modifier of the present invention is synthetic, contains organic matter, exhibits no sedimentation of its inorganic matter, is not a single source material and thus can be manufactured anywhere, and does not require the use of specialized equipment for its manufacture, nor the use of continuous agitation during transport and storage. Also, the modifier does not contain any polymers and thus is not subject to phase separation or similar problems.

In the manufacture of the synthetic modifier of the present invention, 40-70% by weight, refinery bitumen of which one example is 60/70 penetration grade is heated at a temperature of 20° C. -250° C., with stirring. During this heating process, clay and/or sand are added. The term "clay" is a general term which includes, but is not limited to kaolinites and feldspars. A UV absorber may also be added. The clay and/or sand is siloxane bonded together prior to being added to the refinery bitumen. The bitumen is heated up to, but not exceeding 250° C. and the clay, sand and other components are then added and stirred into the hot bitumen. The complete mix continues to be heated and stirred for a total time of about ¾ to 1 hour. The process may be a continuous or a batch process.

The synthetic modifier as produced may then be added to refinery bitumen in different ratios to produce road asphalt cements that have different Superpave PG Ratings. Each PG rating cement may have a different Penetration Grade or Viscosity Grade.

BRIEF DESCRIPTION OF THE DRAWINGS

FIG. 1 is a block flow diagram of one method of preparing the synthetic modifier of the present invention.

DETAILED DESCRIPTION OF THE INVENTION

In the broadest aspect of the present invention, the synthetic modifier may be prepared by adding clay that is siloxane bonded to refinery bitumen, or by adding sand that is siloxane bonded to the refinery bitumen.

If only clay is added, the percentages by weight are as follows:

Refinery bitumen—40 to 70%;
clay, e.g. kaolinites/feldspars—60 to 30%.

If only sand is added, the percentages by weight are as follows:

Refinery bitumen—40 to 70%
sand, e.g., silica—60 to 30%

If both clay and sand are added, the percentages by weight are as follows:

Refinery bitumen—40 to 70%
clay, e.g. kaolinites/feldspars—19 to 9%
sand, e.g., silica—40 to 10%

As an optional ingredient, any suitable type of UV absorber may be added to the mixture of refinery bitumen, clay and/or sand. The UV absorber serves to absorb the ultra violet light from the sun to extend the life of the asphaltic cement made with the synthetic modifier.

Referring to FIG. 1, which shows an exemplary embodiment, 40-70% by weight, refinery bitumen, e.g., 60/70 penetration grade, is heated at a temperature of 20° C. -250° C., with stirring. During this heating process clay and/or sand are added.

As an illustrative example, clays, some of which are stated herein, along with the respective percentages, by weight, are as follows:

Kaolinites—5-10%
Feldspars—4-9%
Sand, e.g., silica—10 -40%
UV absorber—1-5%.

The clays and sand are all siloxane bonded together prior to the addition to the refinery bitumen.

The bitumen is heated up to, but not exceeding 250° C. Each component is then added, not necessarily in the order stated above, and stirred into the hot bitumen.

The complete bitumen mix continues to be heated and stirred for a total time of ¾-1 hr.

This process could be continuous or batch.

The output of this process is the synthetic modifier of the present invention which has the following specifications:

| | |
|---|---|
| Softening Point | 81-86° C. |
| Penetration Value | 3-5 |
| % Organics by weight | 61-66 |
| % Inorganics by weight | 39-40 |
| % Ash by weight | 33-34 |
| % Adsorbed Organics on Inorganics by weight | 5-7 |

ASPHALTIC CEMENT

A sample of the synthetic modifier with 180/200 penetration grade refinery bitumen blended to produce a 60/70 blend and its performance specification is stated as follows:

Synthetic modifier weight %=37.5
Superpave Grade Results (see Appendix 1).
Penetration Grade Results (see Appendix 1).
Viscosity Grade Results (see Appendix 1).
Sedimentation profile: When a modified asphaltic cement was poured into a tube and hung for 3 hours in an oven at 163° C., the sedimentation profile was as follows:

| Sample | % Ash (average) |
| --- | --- |
| Top (of tube) | 9.07 |
| Next to top (of tube) | 10.21 |
| Next to bottom (of tube) | 11.28 |
| Bottom (of tube) | 19.6 |

Another JSSM asphaltic cement sample was prepared exactly as stated above, but this time another kaolinite clay was added and mixed with heat to the modified asphaltic cement. With the addition of a minimum of 2.75% of the clay, the sedimentation profile was as follows:

| Sample | % Ash |
| --- | --- |
| Top (of tube) | 14.35; 14.21 |
| Next to top (of tube) | 14.17; 14.17 |

-continued

| Sample | % Ash |
| --- | --- |
| Next to bottom (of tube) | 14.33; 14.40 |
| Bottom (of tube) | 14.27; 14.19 |

Each sample was poured into its respective tube which had a dimension of 30 cm×2 cm (length×diameter). After 3 hours, each tube was allowed to cool to room temperature, further facilitating sedimentation. Each tube was then cut into four equal pieces by weight and the % ash obtained as per ASTM D2415.

It will be readily seen, therefore, that the new and improved synthetic modifier of the present invention has many advantages, some of which are as follows:

1. JSSM Modifier and its asphaltic cements are non-sedimenting.
2. Modifier when mixed with refinery bitumen, in the ratio as stated, gives rise to an asphalt cement which fits into the SHRP specifications—PG 64-22. Other ratios produce different PG specifications.
3. Modifier is non-single source. It can be manufactured in any part of the world with raw materials that are available internationally.
4. Specialized equipment is not needed when using this synthetic modifier for storage or transportation.
5. Exhibits both sol and gel behavior.
6. Meets SHRP modifier's specifications.
7. Addition of clay renders any asphalt cement mix of the modifier and refinery bitumen in any ratio, non-sedimenting.
8. Can be prepared as a powder or 'chunks'.
9. Simple process.
10. Cost effective.
11. Road building material can be colored.
12. Contains no polymers.
13. Requires no stirring during transport or storage.

The manufacture, handling, transportation and storage are major advantages of the synthetic modifier of the present invention when compared with other known hot mix modifiers presently in use.

While the invention has been described in connection with what is presently considered to be the most practical and preferred embodiments, it is to be understood that the invention is not to be limited to the disclosed embodiments, but on the contrary, is intended to cover various modifications and equivalent arrangements included within the spirit and scope of the appended claims.

APPENDIX 1

| SUPERPAVE GRADING OF JSSM MODIFIED ASPHALT CEMENT - PG64-22 | | | |
| --- | --- | --- | --- |
| TEST | TEST RESULT | AASHTO M320, TABLE Specifications | TEST METHOD |
| Original Binder: Rotational Viscosity; Pa · s, Test temperature 135° C. | 0.300 | 3 Pa · s Max. | AASHTO T316 |
| Original Binder: Dynamic Shear; G*/Sin, kPa, Test temperature 64° C., @ 10 rad/s | 1.02 | 1.00 kPa Min. | AASHTO T315 |
| Ash Content: (% Mass of Residue) | 0.1 | 1.0 Max. | ASTM 2939 |
| Rolling Thin Film Oven Residue: (Mass Loss %) | 0.302 | 1.00 Max. | AASHTO T240 |
| Rolling Thin Film Oven Residue: Dynamic Shear; G*/Sin, kPa, Test temperature 64° C., @ 10 rad/s | 2.65 | 2.20 kPa Min. | AASHTO T315 |
| Pressure Aging Vessel Residue: Dynamic Shear; G*/Sin, kPa, Test temperature 22° C., @ 10 rad/s | 4760 | 5000 kPa Max. | AASHTO T315 |
| Pressure Aging Vessel Residue: Creep Stiffness; MPa, Test temperature −12° C. S, @ 60 s m-value @ 60 s | 150 0.376 | 300 MPa Max. 0.300 Min | AASHTO T313 |

| PENETRATION GRADING OF JSSM MODIFIED ASPHALT CEMENT | | |
| --- | --- | --- |
| TEST | TEST RESULT | TEST METHOD |
| Penetration (25° C., 100 g, 5 s), 0.1 mm | 62-65 | ASTM D5 |
| Flash Point, ° C. | >230 | ASTM D92 |
| Ductility (25° C., 5 cm/min), cm | >100 | ASTM D113 |
| Retained Penetration After Thin Film Oven Test (25° C., 100 g, 5 s), % of original | 65 | ASTM D5 |
| Ductility (25° C., 5 cm/min), After Thin Film Oven Test, cm | 60 | ASTM D113 |
| Solubility in Trichloroethylene, % | 85 | ASTM D2042 |
| Ash, % | 12.8 | ASTM D2415 |

| VISCOSITY GRADING OF JSSM MODIFIED ASPHALT CEMENT | | | |
| --- | --- | --- | --- |
| | TEST | TEST RESULT | TEST METHOD |
| ORIGINAL BINDER | Flash Point ° C. | >230 | ASTM D92 |
| | Solubility in Trichloroethylene, % | 85 | ASTM D2042 |

-continued

VISCOSITY GRADING OF JSSM MODIFIED ASPHALT CEMENT

| | TEST | TEST RESULT | TEST METHOD |
|---|---|---|---|
| | Kinematic Viscosity, 135° C., cst | >280 | ASTM D2170 |
| | Penetration (25° C., 100 g, 5 s), 0.1 mm | 62-65 | ASTM D5 |
| ROLLING THIN FILM OVEN RESIDUE | Mass Loss % | 0.28 | ASTM D2872 |
| | Retained Penetration (25° C., 100 g, 5 s), % original | 65 | ASTM D5 |

What is claimed is:

1. A solid synthetic modifier for hot asphaltic paving mixes, comprising:
 refinery bitumen and clay, the clay being siloxane bonded together by a silane coupling agent.

2. The synthetic modifier of claim 1 wherein the clay is selected from the group of kaolinites and/or feldspars.

3. The synthetic modifier of claim 1 further comprising sand that is siloxane bonded together by a silane coupling agent.

4. The synthetic modifier of claim 3, further comprising a UV absorber.

5. The synthetic modifier of claim 4, wherein the refinery bitumen is 40-70% by weight and includes the following components by weight:
 kaolinites: 5-10%
 feldspars: 4-9%
 sand: 10-40%
 UV absorber: 1-5%.

6. The synthetic modifier of claim 5 having a softening point of 81-86° C., a penetration value of 3-5, 61-66% organics by weight, 39-40% inorganics by weight, 33-34% ash by weight and 5-7% adsorbed organics on inorganics by weight.

7. A method of making the synthetic modifier of claim 1, comprising:
 heating the refinery bitumen to a temperature of 20° C. to 250° C. with stirring,
 adding the clay to the heated refinery bitumen, and
 heating and stirring the mix of refinery bitumen and clay for ¾ to 1 hour.

8. The method of claim 7 wherein the refinery bitumen is 40-70% by weight and the clay includes the following components by weight:
 kaolinites: 5-10%
 feldspars: 4-9%.

9. The method of claim 7 wherein sand that is siloxane bonded together by a silane coupling agent is added to the heated refinery bitumen in a weight percentage of 10-40%.

10. The method of claim 8 wherein the following component is also added to the heated refinery bitumen by weight:
 UV absorber: 1-5%.

11. A method of making a paving asphalt cement, comprising:
 adding the synthetic modifier of claim 1 to a refinery bitumen.

12. The method of claim 11 wherein the synthetic modifier is about 37.5% by weight of the refinery bitumen.

13. The method of claim 12 wherein the asphalt cement produced is a PG 64-22 Superpave Grade material.

14. The method of claim 11 wherein the synthetic modifier is formed of between 40-70% by weight of refinery bitumen and includes the following components by weight:
 kaolinites: 5-10%
 feldspars: 4-9%
 sand: 10-40%
 UV absorber: 1-5%.

15. A solid synthetic modifier for hot asphaltic paving mixes, comprising refinery bitumen and sand, the sand being siloxane bonded together by a silane coupling agent.

16. A method of making the synthetic modifier of claim 15, comprising:
 heating the refinery bitumen to a temperature of 20° C. to 250° C. with stirring;
 adding the sand to the heated refinery bitumen, and
 heating and stirring the mix of refinery bitumen and sand for ¾ to 1 hour.

17. A method of making a paving asphalt cement, comprising:
 adding the synthetic modifier of claim 15 to a refinery bitumen.

18. The method of claim 17 wherein the synthetic modifier is about 37.5% by weight of the refinery bitumen.

* * * * *